United States Patent [19]

Petrovich et al.

[11] 3,855,158

[45] Dec. 17, 1974

[54] RESINOUS REACTION PRODUCTS

[75] Inventors: John P. Petrovich; David L. Taylor, both of St. Louis, Mo.

[73] Assignee: Monsanto Company, St. Louis, Mo.

[22] Filed: Dec. 27, 1972

[21] Appl. No.: 318,820

[52] U.S. Cl. ........ 260/2 BP, 162/164, 260/29.2 EP, 260/584 B
[51] Int. Cl. ............................................ C08g 33/06
[58] Field of Search ........ 260/2 BP, 29.2 EP, 583 P, 260/584 B

[56] References Cited
UNITED STATES PATENTS

| | | | |
|---|---|---|---|
| 2,595,935 | 5/1952 | Daniel | 92/3 |
| 2,969,302 | 1/1961 | Green | 162/164 |
| 3,248,353 | 4/1966 | Coscia et al. | 260/29.2 |
| 3,275,588 | 9/1966 | Garms | 260/29.2 |
| 3,391,090 | 7/1968 | Schiegg | 260/2 |
| 3,520,774 | 7/1970 | Roth | 162/164 |
| 3,536,646 | 10/1970 | Hatch et al. | 260/29.2 |
| 3,577,313 | 5/1971 | Bolger et al. | 162/164 |

*Primary Examiner*—Melvin Goldstein
*Assistant Examiner*—E. A. Nielsen
*Attorney, Agent, or Firm*—J. E. Maurer; N. E. Willis; R. J. Klostermann

[57] ABSTRACT

Cationic resinous compositions comprising reaction products of (A) adducts of certain dihaloalkanes and polyalkylenepolyamines and (B) certain epihalohydrins. Such products may be added to cellulosic substrates to increase wet strength.

13 Claims, No Drawings

RESINOUS REACTION PRODUCTS

BACKGROUND OF THE INVENTION

1. FIELD OF THE INVENTION

This invention relates to cationic resinous compositions which can be used to increase the wet strength of cellulosic substrates.

2. DESCRIPTION OF THE PRIOR ART

U.S. Pat. No. 2,834,675, issued May 13, 1958, discloses resinous compositions of dihaloalkanes and polyalkylenepolyamines which may be added to paper pulp to improve wet strength.

German Pat. No. 955,835, published Jan. 10, 1957, discloses processes for water-proofing paper by adding to the pulp basic products free from reactive halogen or epoxy groups obtained by condensing polyamines with cross-linking compounds such as epichlorohydrin or dichloroethane. Such products also increase the wet strength of paper.

U.S. Pat. No. 2,595,935, issued May 6, 1952, discloses paper products of improved wet strength containing reaction products of polyalkalenepolyamines and bifunctional or polyfunctional halohydrins such as epichlorohydrin.

These prior art resinous compositions, although increasing wet strength, have other disadvantages which often makes them commercially unsatisfactory. For example, a resinous composition prepared by the reaction of dichloroethane and a polyalkylenepolyamine such as ethylenediamine is unsatisfactory in that it takes a long time to cure, in some instances, up to a year. It also is very inefficient, requiring appreciable amounts to obtain adequate wet strength. Likewise, one produced by reacting epichlorohydrin and a polyalkylenepolyamine such as hexamethylenediamine is less efficient.

BRIEF DESCRIPTION OF THE INVENTION

In accordance with this invention, it has been surprisingly found that certain cationic resinous compositions not only increase the wet strength of paper but also are efficient and require short cure times. These cationic resinous compositions comprise the reaction product of A. an adduct of 1. a dihaloalkane represented by the formula

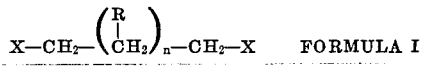

FORMULA I wherein X represents chloro, bromo or iodo, R represents hydrogen, hydroxy or an alkyl group having 1 to 4 carbon atoms, and $n$ is 0 or 1 and 2. a polyalkylenepolyamine represented by the formula

FORMULA II wherein $m$ is an integer of from 4 to about 15 and $p$ is 0 or 1 in a mole ratio of from about 0.5:1 to about 0.95:1 and

B. an epihalohydrin selected from the group consisting of epichlorohydrin, epibromohydrin, and epiiodohydrin, in a mole ratio of from about 1.25 to about 2.5 moles of epihalohydrin per mole of amine group in the adduct.

Aqueous solutions of the resinous compositions of this invention can contain high concentrations of resin solids and still remain stable for extended periods of time. They can be used in stainless steel equipment.

DETAILED DESCRIPTION OF THE INVENTION

Preferably, the novel resinous compositions are produced using water as a solvent. For ease and convenience, this reaction is run such that the aqueous solution obtained by reacting the adduct with the epihalohydrin contains about 40% resin solids. Resin solids of the aqueous solution are determined by totaling the weight of the reactants employed and then dividing by the total weight of the solution including any water added. By controlling the reaction, aqueous solutions are obtained having any viscosity. Generally, they have a viscosity at 40% resin solids on the Gardner-Holdt scale at 25°C of from A to Z, preferably D to H.

The aqueous solutions may be adjusted to any resin solids concentration to facilitate use. Solutions having a resin solids level of from about 5 to 40%, preferably 20 to 35% and a pH lower than 6 at 25°C are stable for extended periods of time, i.e., over 3 months. A pH of 4.5 to 5.5 is preferred. Generally, the pH is always at least 3, so the solutions can be used in stainless steel equipment. Aqueous solutions having a high concentration of resin solids are preferred to reduce costs, when the solutions must be transported long distances.

Generally, aqueous solutions of the novel resinous compositions in which the epihalohydrin is reacted with the adduct in a molar proportion of epihalohydrin to amine group of the adduct above 2.5:1 are not thermosetting and those below 1.25:1 generally gel. Preferably, the molar proportion is from about 1.5:1 to about 2.25:1. This also is the preferred proportion for the novel resinous compositions.

The adducts of this invention obtained by reacting the dihaloalkane with the polyalkylenepolyamine contain essentially linear or branched units with little or no cyclic units. It is preferred that about 85% of the units of the adducts be linear or branched with more than 95% being preferred. They are generally prepared using as a solvent water, water miscible alcohols or mixtures thereof. Aqueous solutions are clear, pale yellow having a pH of from about 8 to 11 at 25°C. Any concentration of the adduct can be used as long as it is suitable for further reaction with the epihalohydrin. A suitable concentration of adduct is from about 25 to 55% by weight, based on the total weight of the solution of adduct. Likewise, the concentration may be adjusted by the addition or removal of solvent to give any desired viscosity. For example, a viscosity of about A to H on the Gardner-Holdt scale at 25°C is suitable for reacting with epihalohydrin.

Illustrative dihaloalkanes represented by Formula I where $n$ is 0 include 1,2-dichloroethane, 1,2-dibromoethane, 1,2-diiodoethane; and where n is 1 include 1,3-diiodopropane, 1,3-dichloro-2-methyl propane, 1,3-dibromo-2-butyl propane, 1,3-dichloro-2-isobutyl propane, 1,3-dichloro-2-hydroxy-methyl propane, and 1,3-dibromo-2-hydroxy propane. It is preferred that $n$ be 0 and 1,2-dichloroethane is especially preferred.

As mentioned, those dihaloalkanes represented by Formula I when reacted with the proper polyalkylenepolyamines of this invention form adducts containing essentially linear or branched units. α,ω-dihaloalkanes containing 4 to 6 carbon atoms between the halo substituents form piperidine type structures and are not suitable as the major proportion of the adduct in the practice of this invention. However, adducts containing cyclic units may be used to replace a portion of the linear or branched units of the adduct of this invention, i.e., up to about 15 to 20%.

Adducts of this invention possessing substantially the same properties as the adducts prepared using α,ω-dihaloalkanes represented by Formula I, which can be prepared in the same manner and are equivalents thereof are those wherein the α,ω-dihaloalkanes contain over 6 carbon atoms. Such dihaloalkanes include 1,7-dichloroheptane 1,3-dibromopentane and 1,12-dichlorododecane. Likewise, adducts of this invention possessing substantially the same properties as the adducts prepared using α,ω-dihaloalkanes represented by Formula I, or the equivalent α,ω-dihaloalkanes containing more than 6 carbon atoms, which can be prepared in the same manner and are equivalents thereof are those wherein the α,ω-dihaloalkanes have one, two or more simple substituents, including but not limited to, lower alkyl, e.g., methyl, ethyl, butyl; nitro; sulfato; sulfonyloxy; carboxy; carbo-lower-alkoxy, e.g., carbomethoxy, carbethoxy; amido; hydroxy; lower-alkoxy, e.g., methoxy, ethoxy, and lower-alkanoyloxy, e.g., acetoxy.

Illustrative polyalkylenepolyamines represented by Formula II where p is 0 include 1,4-tetramethylenediamine, 1,5-pentamethylenediamine, 1,6-hexamethylenediamine, 1,10-decamethylenediamine, 1,12-dodecamethylenediamine, 1,15-pentadecylmethylenediamine; and where p is 1 include bistetramethylenetriamine, bishexamethylenetriamine, bisheptamethylenetriamine, bisnonamethylenetriamine, bispentadecylmethylenetriamine. It is preferred that p be 0 and that m be from 4 to 10; 1,6-hexamethylenediamine is especially preferred.

As mentioned, the adducts of this invention contain essentially linear or branched units. Polyalkylenepolyamines represented by Formula II will form these adducts when reacted with the proper dihaloalkane. Di or triamines containing less than 4 carbon atoms between the amine groups tend to form adducts containing essentially all cyclic units. Adducts containing a major proportion of cyclic units are not suitable in the practice of this invention. However, a minor proportion, i.e., 15 to 20% of the adduct of this invention may be replaced with adducts containing essentially all cyclic units.

Adducts of this invention possessing substantially the same properties as the adducts prepared using polyalkylenepolyamines represented by Formula II, which can be prepared in the same manner and are equivalents thereof are those (1) wherein the polyalkylenepolyamine contains more than 15 carbon atoms such as 1,19 nonadecyldiamine; (2) wherein the polyalkylenepolyamine bears one, two, or more simple substituents including but not limited to lower alkyl, e.g., methyl, ethyl, butyl; nitro; sulfate; sulfonyloxy; carboxy; carbo-lower-alkoxy, e.g., carbomethoxy, carboethoxy; amido; hydroxy; lower-alkoxy, e.g., methoxy, ethoxy and lower-alkanoyloxy, e.g., acetoxy or (3) wherein the polyalkylenepolyamines contain more than 15 carbon atoms and bears one, two or more simple substituents described in (2) above.

Epichlorohydrin, epibromohydrin and epiiodohydrin are the epihalohydrins that may be used in the practice of this invention.

Examples of adducts and resinous reaction products defined by the above formulae are shown in the following tables.

TABLE I

| | Dihaloalkane | ADDUCT Polyalkylenepolyamine | Mole Ratio* |
|---|---|---|---|
| A | 1,3-dichloro-2-hydroxy propane + | 1,6-hexamethylenediamine | 0.7 |
| B | 1,3-dichloro-2-ethyl propane + | 1,10-decamethylenediamine | 0.85 |
| C | 1,2-dichloroethane + | 1,6-hexamethylenediamine | 0.90 |
| D | 1,3-dichloro-2-butyl propane + | 1,8-octamethylenediamine | 0.6 |
| E | 1,2-dibromopropane + | 1,14-tetradecamethylenediamine | 0.95 |
| F | 1,2-dibromoethane + | bishexamethylenediamine | 0.5 |
| G | 1,3-dichloro-2-butyl propane + | bistridecamethylenediamine | 0.75 |

*dihaloalkane: polyalkylene

TABLE II

| Sample | Adduct* | RESINOUS REACTION PRODUCT Epihalohydrin | Mole Ratio** |
|---|---|---|---|
| 1 | A + | epichlorohydrin | 1.25:1 |
| 2 | B + | epiiodohydrin | 1.5:1 |
| 3 | C + | epichlorohydrin | 1.75:1 |
| 4 | D + | epibromohydrin | 1.25:1 |
| 5 | E + | epichlorohydrin | 2.25:1 |
| 6 | F + | epibromohydrin | 1.87:1 |
| 7 | G + | epichlorohydrin | 2.0:1 |

*From Table I
**Moles of epihlaohydrin per mole of amine group in said polyalkylenepolyamine The dihaloalkanes defined by Formula I may be reacted with polyalkylenepolyamines defined by Formula II according to the procedure described in U.S. Pat. No. 2,834,675 which is incorporated herein by reference.

For example, the dihaloalkanes are reacted with the polyalkylenepolyamines in the aforementioned ratios at a temperature range of from about 25°C to reflux or above preferably from about 60°C to 90°C in a solvent such as water, water miscible alcohols or mixtures thereof. Water is preferred. Any suitable solids content of the reactants in the reaction mixture may be employed. It is most advantageous that initially they be high, 60 to 90% by weight, based on the total weight of the reaction mixture.

As the reaction proceeds, the viscosity increases, it is conveniently kept from G to S on the Gardner-Holdt scale by the addition of solvent. Viscosity is measured at 25°C. In order to maintain a reasonable reaction rate any strong base or other acid acceptor may be added to neutralize any HCL formed. These bases include alkali metal hydroxides or alkali metal alkoxides.

The reaction is carried out until there are substantially no free dihaloalkanes present in the reaction mixture.

The adduct may be reacted with epihalohydrin according to the procedure described in U.S. Pat. No. 2,595,935 which is incorporated herein by reference.

For example, epihalohydrin is added to the adduct in the presence of a solvent such as water, water miscible alcohols or mixtures thereof at a temperature range of from about 25° to 45°C preferably from about 25° to 35°C over a period of 10 minutes to 120 minutes preferably 30 minutes to 90 minutes. The solids concentration of the reactants in the reaction mixture during the reaction is from about 20% to about 60%, by weight, preferably from about 30% to about 40%, based on the total weight of the reaction mixture. After addition is complete, the temperature is raised by the addition of heat to about 60° to about 80°C. Reaction is continued at this temperature range by the addition of more heat until the resinous reaction product reaches a viscosity at 40% resin solids measured at 25°C on the Gardner-Holdt scale within the order of A to about Z preferably from about D to about H. The pH is reduced by the addition of a suitable acidic substance, well known to those skilled in the art such as $H_2SO_4$, HCl, etc.

As stated above, the resinous reaction products of this invention are particularly valuable as wet strength improvers for cellulosic substrates, particularly paper. Paper, in accordance with this invention, includes all materials which are encompassed within the ordinary and usual meaning of the word. Generally speaking, paper includes cellulosic and other vegetable fibers formed into thin felts or nonwoven sheets.

Aqueous solutions of the novel resinous compositions are particularly valuable in increasing the wet strength of paper. Generally, they contain 5 to 40% of uncured resin solids, preferably 20 to 35%; and 60 to 95%, preferably 65 to 80% by weight of water, based on the total weight of the aqueous solution. Any concentration of the uncured resin solids may be used to increase the wet strength of paper except as limited by handling conditions. Likewise, they can be used at any viscosity except as limited by handling conditions.

When the reaction products of this invention are applied to cellulosic paper products of various types, conventional techniques known to those skilled in the art may be used. Thus, for example, preformed and partially or completely dried paper may be impregnated by immersion in, or spraying with, an aqueous solution of the resin following which the paper may be heated for about 0.5 to 30 minutes at temperatures of 90°C. to 100°C. or higher to dry same and cure the resin to a water insoluble condition. The resulting paper has increased wet strength, and, therefore, this method is well suited for the impregnation of paper towels, absorbent tissue and the like as well as heavier stocks such as wrapping paper, bag paper and the like to impart wet strength characteristics thereto.

The preferred method of incorporating these resins in paper, however, is by internal addition prior to sheet formation whereby advantage is taken of the substantivity of the resins for hydrated cellulosic fibers. In practicing this method an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner, thereby curing the resin to its polymerized and water insoluble condition and imparting wet strength to the paper.

The cationic thermosetting resins herein disclosed impart wet strength to paper when present therein in amounts of about 0.1–5% or more based on the dry weight of the paper. The quantity of resin to be added to the aqueous stock suspension will depend on the degree of wet strength desired in the finished product and on the amount of resin retained by the paper fibers.

The uncured cationic thermosetting resins of the invention, incorporated in paper in any suitable manner, as described above, may be cured under acid, neutral or alkaline conditions, i.e., at pH's from about 3.0 to 13 by subjecting the paper to a heat-treatment for about 0.5 to 30 minutes at a temperature from about 90° to 100°C. Optimum results, however, are obtained under alkaline conditions. For example, in those applications where short cure times are required, for example, fine papers such as sanitary tissues, the resinous compositions may be made alkaline (pH 8–13) prior to use. Such a pretreatment results in shorter cure times and increased wet strength. Any strong base may be used such as alkali metal hydroxides or alkoxides. Sodium hydroxide is preferred.

The following Examples illustrate the invention.

EXAMPLE I

Fifty-eight grams (0.5 mole) of 1,6-hexamethylenediamine is placed in a 4-necked flask equipped with a thermometer, mechanical stirrer, condenser and an additional funnel. To this is added 10.2 grams of water and the mixture heated externally to 70°C. Forty-two grams (0.43 mole) of 1,2-dichloromethane is added at a rate slow enough to keep the reaction temperature below 75°C, ≈3 hours addition time. Water, 8 grams at a time, is added during this 3 hr. period to keep the reaction viscosity below Gardner S. When the addition of 1,2-dichloroethane is complete, add 8 grams of 50% aqueous sodium hydroxide. Maintain the reaction at 70°C until the viscosity reaches Gardner V. At this point, add 8 grams of water and raise the temperature to 80°C. Maintain 80°C until the viscosity reaches Gardner T. Add 315 grams of water and cool the mixture to 25°C. To this mixture, over a 1 hr. period, add 184.8 grams (2 moles) of epichlorohydrin allowing the reaction temperature to raise to 45°C. After an additional hour at 45°C, raise the reaction temperature to 65°C and maintain until the viscosity of the solution reaches Gardner D. At this viscosity, add 9 grams of 98% by weight sulfuric acid and 227 grams of water. Adjust the final pH to ≈5 and the final solids to 25% with additional sulfuric acid and water.

An actual experimental run of the above procedure yielded 1,200 grams of a solution containing 25% solids and having a pH of 4.5 at 25°C.

EXAMPLE II

Following the procedure of Example I, the adducts and resinous reaction products set out in Tables III and IV are prepared by substituting for 1,2-dichloroethane, 0.43 mole of 1,2-dibromoethane, 0.43 mole of 1,2-diiodoethane, 0.43 moles of 1,3-dichloro-2-methyl propane, 0.43 mole of 1,3-diiodo-2-butyl propane or 0.43 mole of 1,3-dichloro-2-isobutyl propane; or for epichlorohydrin 2 moles of epiiodohydrin, or 2 moles of epibromohydrin; or for 0.5 mole of 1,5-hexamethylenediamine 0.5 mole of 1,5-pentamethylenediamine, 0.5 moles of 1,7-heptamethylenediamine, 0.5 moles of 1,12-dodecamethylenediamine, 0.5 mole of bisheptamethylenetriamine, or 0.5 mole of bistetradecamethylenetriamine.

TABLE III

| | Dihaloalkane | ADDUCT Polyalkylenepolyamine | Mole Ratio* |
|---|---|---|---|
| A | 1,2-dibromoalkane | + 1,6-hexamethylenediamine | 0.86:1 |
| B | 1,2-diiodalkane | + do. | 0.86:1 |
| C | 1,3-dichloro-2-methylpropane | + do. | 0.86:1 |
| D | 1,3-diiodo-2-butylpropane | + do. | 0.86:1 |
| E | 1,3-dichloro-2-isobutylpropane | + do. | 0.86:1 |
| F | 1,2-dichloroalkane | + 1,3-pentamethylenediamine | 0.86:1 |
| G | 1,2-dichloroalkane | + 1,7-heptamethylenediamine | 0.86:1 |
| H | 1,2-dichloroalkane | + 1,12-dodecamethylenediamine | 0.86:1 |
| I | 1,2-dichloroalkane | + bisheptamethylenetriamine | 0.86:1 |
| J | 1,2-dichloroalkane | + bistetramethylenetriamine | 0.86:1 |

*Dihaloalkane: polyalkylenepolyamine

TABLE IV

| | RESINOUS REACTION PRODUCT | | |
|---|---|---|---|
| | Adduct* | Epihalohydrin | Mole Ratio** |
| 1 | A + | epibromohydrin | 2:1 |
| 2 | B + | epiiodohydrin | 2:1 |
| 3 | C + | epichlorohydrin | 2:1 |
| 4 | D + | epichlorohydrin | 2:1 |
| 5 | E + | epichlorohydrin | 2:1 |
| 6 | F + | epichlorohydrin | 2:1 |
| 7 | G + | epibromohydrin | 2:1 |
| 8 | H + | epibromohydrin | 2:1 |
| 9 | I + | epichlorohydrin | 2:1 |
| 10 | J + | epichlorohydrin | 2:1 |

*from Table III
**Moles of epihalohydrin per mole of amine group of the adduct

EXAMPLE III

Following the procedure of Example I, the adducts and resinous reaction products set out in Tables III and IV are prepared but at different mole ratios. They are described in Tables V and VI.

TABLE V

| | ADDUCT Adduct | Mole Ratio |
|---|---|---|
| 1 | A | 0.7:1 |
| 2 | A | 0.8:1 |
| 3 | A | 0.9:1 |
| 4 | B | 0.6:1 |
| 5 | B | 0.5:1 |
| 6 | B | 0.94:1 |
| 7 | C | 0.85:1 |
| 8 | D | 0.6:1 |
| 9 | E | 0.65:1 |
| 10 | F | 0.55:1 |
| 11 | F | 0.78:1 |
| 12 | G | 0.9:1 |
| 13 | H | 0.89:1 |
| 14 | I | 0.86:1 |
| 15 | I | 0.74:1 |

TABLE VI

| | RESINOUS REACTION PRODUCTS | | |
|---|---|---|---|
| | Adduct Of Table V | Epihalohydrin | Mole Ratio* |
| 1 | A | epibromohydrin | 2.25:1 |
| 2 | A | epibromohydrin | 1.25:1 |
| 3 | A | epibromohydrin | 1.6:1 |
| 4 | B | epiiodohydrin | 2.45:1 |
| 5 | B | epiiodohydrin | 1.45:1 |
| 6 | B | epiiodohydrin | 1.9:1 |
| 7 | C | epichlorohydrin | 1.85:1 |
| 8 | D | epichlorohydrin | 2:1 |
| 9 | E | epichlorohydrin | 2.0:1 |
| 10 | F | epichlorohydrin | 2.25:1 |
| 11 | F | epichlorohydrin | 1.9:1 |
| 12 | G | epibromohydrin | 1.8:1 |
| 13 | H | epibromohydrin | 1.45:1 |
| 14 | I | epichlorohydrin | 1.6:1 |
| 15 | I | epichlorohydrin | 1.75:1 |

*Mole of epihalohydrin per mole of amine group of the adduct

EXAMPLE IV

To an aqueous plup slurry of 0.5% consistency and pH of 8.0 composed of unbleached softwood kraft fibers beaten to a Canadian standard freeness of 455 ml is added the appropriate amount of the thermosetting resin of Example I. The pulp slurry is readjusted to pH 8 with 1% sodium hydroxide and stirred briefly to allow the resin to distribute on the pulp. The fibers are formed into a wet-laid web having a consistency of 34% on a Noble and Wood lab handsheet machine. The wet sheets are pressed on a material felt and dried for 2 minutes on a lab down drier at 204°F. The resulting 2.5g. 8 inch × 8 inch handsheet is cut into 1 inch × 8 inch strips. The strips are oven cured for 10 minutes at 105°C. The cured strips are soaked in water for 10 minutes and tested for wet strength.

An actual run of the above procedure gave the results set out in Table VII.

TABLE VII

| Sample | Resin Level % | Wet Tensile lb./inch* |
|---|---|---|
| 1 | 0 | 0.6 |
| 2 | 0.25 | 3.17 |
| 3 | 0.50 | 5.20 |
| 4 | 0.75 | 5.91 |

*measured using Instrom Tensile Tester

EXAMPLE V

Following the procedure of Example IV, the resinous reaction products set out in Table IV are used in place of the thermosetting resin of Example I.

EXAMPLE VI

Following the procedure of Example IV, the resinous reaction products set out in Table VI are substituted for the thermosetting resins of Example I.

What is claimed is:

1. A cationic resinous composition comprising the reaction product of
   A. an adduct of
      1. a dihaloalkane represented by the formula

wherein X represents chloro, bromo, or iodo, R is hydrogen, hydorxy or alkyl group having 1 to 4 carbon atoms, and $n$ is 0 or 1 and
      2. a polyalkylenepolyamine represented by the formula

wherein $m$ is an integer of from 4 to about 15 and $p$ is 0 or 1
   in a mole ratio of from about 0.5:1 to about 0.95:1 and
   B. an epihalohydrin selected from the group consisting of epichlorohydrin, epibromohydrin, and epiiodohydrin,
   in a mole ratio of from about 1.25 to about 2.5 moles of epihalohydrin per mole of amine group in said adduct.

2. A composition according to claim 1 wherein X is chloro and $n$ is 0.

3. A composition according to claim 2 wherein $p$ is 0.

4. A composition according to claim 3 wherein $m$ is 4 to 10.

5. A composition according to claim 4 wherein the mole ratio of epihalohydrin to amine of said adduct is from about 1.5 to about 2.25 moles of epihalohydrin per mole of amine group in said adduct.

6. A composition according to claim 5 wherein $m$ is 6.

7. An aqueous solution of the resinous reaction product of claim 5 comprising from about 5 to about 40% of resin solids and from about 60 to 95% by weight of water, based on the weight of said solution, said aqueous solution having a pH of from about 4.5 to 5.5 at 25°C.

8. A solution according to claim 7 containing sufficient strong base to increase the pH to 8 to 13.

9. A solution according to claim 8 wherein the strong base is sodium hydroxide.

10. An aqueous solution of the resinous reaction product of claim 6 comprising from about 5 to about 40% of resin solids and from about 60 to 95% by weight of water based on the weight of said solution, said aqueous solution having a pH of from about 4.5 to about 5.5 at 25°C.

11. An aqueous solution of the resinous reaction product of claim 6 consisting essentially of from about 20 to about 35% of resin solids and from about 65 to 80% by weight of water based on the weight of said solution, said aqueous solution having a pH of from about 4.5 to 5.5 at 25°C.

12. A solution according to claim 7 containing sufficient strong base to increase the pH to 8 to 13.

13. A solution according to claim 12 wherein the strong base is sodium hydroxide.

* * * * *

PO-1050
(5/69)

UNITED STATES PATENT OFFICE
CERTIFICATE OF CORRECTION

Patent No. 3,855,158          Dated December 17, 1974

Inventor(s) John P. Petrovich and David L. Taylor

It is certified that error appears in the above-identified patent and that said Letters Patent are hereby corrected as shown below:

Column 1, lines 47 - 50, Formula I should read:

$$X - CH_2 - \overset{R}{\underset{|}{CH}}{}_n - CH_2 - X$$

Column 8, line 36, change "plup" to --- pulp ---.

Claim 1, lines 11 - 14, should read:

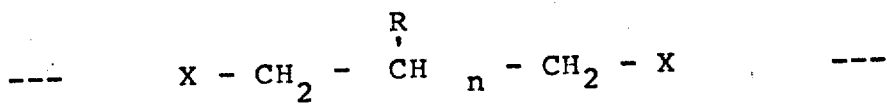

$$X - CH_2 - \overset{R}{\underset{|}{CH}}{}_n - CH_2 - X$$

Claim 1, line 16, change "hydorxy" to --- hydroxy ---.

Signed and sealed this 15th day of April 1975.

(SEAL)
Attest:

RUTH C. MASON
Attesting Officer

C. MARSHALL DANN
Commissioner of Patents
and Trademarks